United States Patent [19]
Fath et al.

[11] 3,872,053
[45] Mar. 18, 1975

[54] FLAME-RETARDANT POLYURETHANE COMPOSITIONS

[75] Inventors: Joseph Fath, Princeton; Roy T. Gottesman, Glen Rock, both of N.J.

[73] Assignee: Tenneco Chemicals Inc., Saddle Brook, N.J.

[22] Filed: Dec. 12, 1973

[21] Appl. No.: 424,237

Related U.S. Application Data

[63] Continuation-in-part of Ser. No. 290,059, Sept. 18, 1972, abandoned.

[52] U.S. Cl. .................. 260/45.7 P, 260/2.5 AJ
[51] Int. Cl. ............................................ C08d 11/04
[58] Field of Search .................. 260/2.5 AJ, 45.7 P

[56] References Cited

UNITED STATES PATENTS 3,706,821   12/1972   Anderson et al. .............. 260/45.7 P

*Primary Examiner*—Melvyn I. Marquis
*Attorney, Agent, or Firm*—Evelyn Berlow

[57] ABSTRACT

Polyurethane resin compositions contain as flame-retardant either an aryl haloalkyl phosphate or an aryloxyalkyl haloalkyl phosphate. Illustrative of these flame-retardant phosphate esters is diphenyl (1,3-dichloropropyl) phosphate.

14 Claims, No Drawings

FLAME-RETARDANT POLYURETHANE COMPOSITIONS

This is a continuation-in-part of our copending application Ser. No. 290,059, which was filed on Sept. 18, 1972 and now abandoned.

This invention relates to polyurethane foams. More particularly, it relates to flame-retardant polyurethane foams and to a process for their production.

Conventional polyurethane foams have little inherent resistance to burning. In view of the wide-spread use of polyurethane foams in mattresses, cushions, and other upholstery, there is a need for flame-resistant products. A number of organic and inorganic compounds have been suggested as flame-retardants for polyurethane foams, but none has proven to be entirely satisfactory for this purpose. For example, some phosphates are effective as flame-retardants, but they are thermally unstable, and when subjected to elevated temperatures during extrusion, molding, and other fabrication they decompose to form free acids that have a deleterious effect on the properties of the foamed product and that cause corrosion of the processing equipment. Foams containing certain of the phosphate esters, including tris(2-chloroethyl) phosphate, also undergo a relatively large loss of compressive strength after being subjected to himidity aging conditions. In addition many of these esters have a tendency to evaporate or to migrate, so that even under normal conditions polyurethane resin compositions that contain them lose their flame-retardant qualities after a relatively short period of time.

When halogen-containing compounds that do not contain phosphorus, such as pentabromodiphenyl ether, are used as the sole flame-retarding agent in polyurethane resin composition, they must be present in large concentrations in order to provide satisfactory resistance to burning. A high halogen content, however, often has a deleterious effect on the physical and mechanical properties of the foamed resins. Phosphorus-containing compounds that do not contain halogen, such as isodecyl diphenyl phosphate, cresyl diphenyl phosphate, and triphenyl phosphate, usually do not impart the desired flame-retardant properties to polyurethane resins.

In accordance with this invention, it has been found that flame-retardant polyurethane resin composition result when certain aryl haloalkyl phosphates or aryloxyalkyl haloalkyl phosphates are incorporated into the compositions. These phosphate esters are very effective as flame-retardant additives for polyurethane resin compositions. They provide flame-retardance equivalent to or better than that obtained using tris (haloalkyl) phosphates or the corresponding haloaryl haloalkyl phosphates and haloaryloxyalkyl haloalkyl phosphates at an appreciably lower cost. When used in the amounts necessary to effect flame-retardancy, the phosphate esters of this invention do not adversely affect the physical or mechanical properties of the polyurethane resin compositions. The aryl haloalkyl phosphates and the aryloxyalkyl haloalkyl phosphates are stable to heat and to humidity, and they do not decompose to any appreciable extent during the production and fabrication of the resinous compositions. Because of their low volatility, these esters have little tendency to migrate, and compositions that contain them retain their flame-retardant characteristics for prolonged periods of time.

The flame-retardant compositions of this invention are obtained by incorporating into a polyurethane resin composition a flame-retarding amount of a phosphate ester that has the structural formula

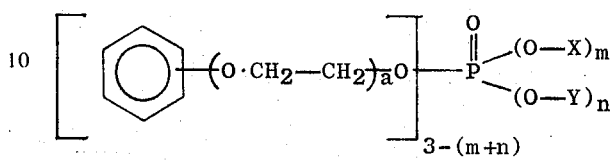

wherein X and Y each represents haloalkyl having 2 to 4 carbon atoms and at least 2 halogen atoms selected from the group consisting of chlorine, bromine, and mixtures thereof;

$a$ represents a number in the range of 0 to 1; and $m$ and $n$ each represents a number in the range of 0 to 2, the sum of $m$ and $n$ being 1 or 2. Illustrative of these phosphate esters are phenyl bis(2,3-dibromopropyl) phosphate, phenyl bis(1,3-dichloropropyl) phosphate, phenyl bis(1-chloro-3-bromopropyl) phosphate, phenyl bis(3,3-dibromopropyl) phosphate, phenyl bis(2,3-dichloropropyl) phosphate, diphenyl (2,3-dibromopropyl) phosphate, diphenyl (1,3-dichloropropyl) phosphate, diphenyl (1-chloro-3-bromopropyl) phosphate, diphenyl (3,3-dichloropropyl) phosphate, diphenyl (1,3-dibromopropyl) phosphate, phenoxyethyl bis(2,3-dibromopropyl) phosphate, phenoxyethyl bis(1,3-dichloropropyl) phosphate, phenoxyethyl bis(3,3-dibromopropyl) phosphate, phenoxyethyl bis(1-chloro-3-bromopropyl) phosphate, bis(phenoxyethyl) (2,3-dibromopropyl) phosphate, bis(phenoxyethyl) (1,3-dichloropropyl) phosphate, bis(phenoxyethyl) (1-chloro-3-bromopropyl) phosphate, and mixtures thereof.

The phosphate esters that are used to impart flame-retardancy to polyurethane resins may be prepared by any suitable and convenient procedure. For example, the aryl haloalkyl phosphates can be prepared by reacting the appropriate haloalkyl chlorophosphate with an aqueous solution of sodium phenate at a temperature of 0°–10°C., and the aryloxyalkyl haloalkyl phosphates can be prepared by reacting the appropriate haloalkyl chlorophosphate with an aryloxyalkanol at a temperature in the range of about 40°–80°C. at either atmospheric or subatmospheric pressure. The haloalkyl chlorophosphates that are used in the preparation of the phosphate esters of this invention can be prepared by reacting phosphorus oxychloride with a haloalkanol or an epihalohydrin in the presence of a catalyst, such as anhydrous magnesium chloride, magnesium oxide, or tetrabutyl titanate, at a temperature between about 40° and 90°C. The aryl haloalkyl phosphates and the aryloxyalkyl haloalkyl phosphates are usually washed with an alkaline aqueous solution and with water to remove residual acidity and dried before being incorporated into a polyurethane resin composition.

The process of this invention can be used to improve the flame-retardancy of rigid, semi-rigid, and flexible polyurethane foams as well as unfoamed polyurethane resin compositions. It is of particular vlaue in the production of flame-retardant flexible polyurethane foams.

The flame-retardant polyurethane resin compositions of this invention may be prepared by any known method. Suitable methods include the one-shot method, the total prepolymer method, the semi-prepolymer method, and modifications of these methods. In the one-shot procedure, the polyol, phosphate ester, catalyst (and blowing agent and surfactant if foams are being produced) are blended together before being mixed with the isocyanate component. In the prepolymer process, all or part of the polyol is mixed with the isocyanate before the catalyst, surfactant, blowing agent (if foams are being produced), phosphate ester, and any remaining polyol are added. The use of a catalyst is not essential in the production of polyurethane resins; therefore the catalyst is not a critical part of the present flame-retardant compositions.

Any of the polyols known to be suitable for preparing polyurethane resins may be used in the practice of this invention. These include polyesters having terminal hydroxyl groups, hydroxyl-terminated polyalkylene ethers, and hydroxyl polyester amides. The molecular weights of these compounds should be at least 500 and preferably between about 750 to 10,000; their hydroxyl numbers should be between about 15 and 700 and preferably between 30 and 60. The acid number should not be greater than 50 and is preferably below 2.

Suitable polyesters can be prepared by the condensation of a dicarboxylic acid, acid anhydride, or acid chloride with a polyhydric alcohol. The polyhydric alcohol is generally an aliphatic glycol, such as ethylene glycol, propylene glycol, 2,2-diemthylpropylene glycol, hexanediol-1,5, neopentyl glycol, diethylene glycol, triethylene glycol, and the like as well as mixtures of such diols with each other and/or with minor amounts of polyols having more than two hydroxyl groups, such as glycerol, trimethylolpropane, trimethylolethane, 1,2,6,-hexanetriol, pentaerythritol, and sorbitol. Aromatic polyols, such as trihydroxymethylbenzene, can also be used.

The polycarboxylic acids that can be used in the preparation of the polyesters include dicarboxylic acids and tricarboxylic acids that contain from 2 to about 36 carbon atoms. The preferred acids are dicarboxylic acids that contain from 4 to 12 carbon atoms. These include aromatic acids and their anhydrides, such as phthalic acid, terephthalic acid, isophthalic acid, and tetrachlorophthalic acid; cycloaliphatic acids, such as dimerized linoleic acid, maleated and fumarated rosin acids, and cyclohexane-1,4-diacetic acids; and aliphatic acids, such as adipic acid, succinic acid, sebacic acid, oxalic acid, azelaic acid, glutaric acid, suberic acid, methyladipic acid, pimelic acid, maleic acid, fumaric acid, citraconic acid, itaconic acid, tricarballylic acid, oxydipropionic acid, and mixtures of such acids.

In the preparation of the polyesters, an excess of polyol over polycarboxylic acid is used to insure that the resulting essentially linear polyester chains contain a sufficient number of reactive hydroxyl groups.

Another useful group of polyols are the polyalkylene ether, thioether, and ether-thioether glycols represented by the general formula

wherein $R^2$ represents an alkylene group having from 2 to about 10 carbon atoms. E represents oxygen or sulfur, and g is an integer large enough so that the molecular weight of the ether, thioether, or ether-thioether is in the range of about 500 to 10,000. Illustrative of these useful polyalkylene ether glycols are polyethylene glycols, polypropylene glycols, polytetramethylene glycols, polyhexamethylene glycols, and the like, which are prepared by the acid-catalyzed condensation of the corresponding monomeric glycols or by the condensation of lower alkylene oxides with themselves or with glycols.

Polyalkylenearylene ethers, thioethers, and ether-thioether glycols that have arylene groups, such as phenylene, naphthalene, or anthrylene, in place of some of the alkylene groups of the above-described polyalkylene groups can also be used. Another class of suitable polyols includes polyalkylene ether polyols containing more than two reactive hydroxyl groups, such as polyalkylene ether triols, tetrols, and the like, which are prepared by reacting a polyol, such as glycerol, trimethylolethane, pentaerythritol, dipentaerythritol, sorbitol, or sucrose, with a lower alkylene oxide, such as ethylene oxide or propylene oxide.

Any of a wide variety of organic isocyanates may be used, including aliphatic, cycloaliphatic, heterocyclic, and aromatic di- and polyisocyanates, and combinations of these isocyanates. Examples include 2,4-tolylene diisocyanate, 2,6-tolylene diisocyanate, phenylene diisocyanates, 1,4-naphthylene diisocyanate, 1,5-naphthylene diisocyanate, 4,4'-diphenylmethane diisocyanate, p,p'-diphenyl diisocyanate, methylene diisocyanate, trimethylene diisocyanate, tetramethylene-1,4-diisocyanate, butylene-1,4-diisocyanate, butylene-2,3-diisocyanate, hexamethylene diisocyanate, cyclohexylene-1,2-diisocyanate, methylene bis(4-phenylisocyanate), diphenyl-3,3'-dimethyl-4,4'-diisocyanate, xylylene diisocyanate, cyclohexane-1,4-diisocyanate, 1-methoxyphenyl-2,4-diisocyanate, benzene-1,2,4,-triisocyanate, polymethylene polyphenylisocyanate, tolylene-2,4,6-triisocyanate, 4,4'-dimethyldiphenyl methane-2,2', 5,5'-tetraisocyanate, 4,4'-biphenylene diisocyanate, triphenylmethane-4,4',4''-triisocyanate, cumylene 2,4-diisocyanate, durylene diisocyanate, 2,4-diphenylhexane-1,6diisocyanate, 2-chlorotrimethylene diisocyanate, diphenyl-2,4,4'-triisocyanate, and the like and mixtures thereof.

The aromatic diisocyanates, and particularly the tolylene diisocyanates, are generally the least expensive and most reacitve polyisocyanates available and therefore are preferred. For certain purposes, however, the aliphatic, aralkyl, and cycloaklyl polyisocyanates have valuable properties and can be used alone or in admixture with aromatic diisocyanates.

The amount of the phosphate esters that is used in polyurethane resin composition is that which will impact flameretardance to the compositions without adversely affecting their physical properties. In most cases, about 5 to 35% of the phosphate ester, based on the weight of the polyol, is used, with 10 to 25%, based on the weight of the polyol, preferred. To achieve self-extinguishment, the composition should contain the amount of the ester that is sufficient to provide at least 1% by weight of phosphorus in the presence of chlorine or at least 0.5% by weight of phosphorus in the presence of bromine.

The flame-retardance of the compositions of this invention was determined by ASTM Method 1692-68T, "Method of Test for Flammability of Plastic Foams and Sheeting." The term "flame-retardant" as used herein indicates that when tested by the procedure of ASTM 1692-68T the composition is self-extinguishing, or it burns at a slower rate than does the corresponding composition that does not contain a phosphate ester.

In addition to the flame retardant, the polyurethane resin compositions may contain synergists such as antimony oxide, fillers, pigments, emulsifiers, blowing agents, inhibitors against discoloration and aging, and other additives in the amounts commonly used for these purposes.

The invention is further illustrated by the following examples. In these examples, all parts by weight and all percentages are percentages by weight.

EXAMPLE 1

To a mixture of 306.6 parts (2.0 moles) of phosphorus oxychloride and 2.0 parts (0.02 mole) of anhydrous magnesium chloride which had been heated with stirring to 50°C. was added 872 parts (4.0 moles) of 2,3-dibromopropanol over a period of 5 hours at such a rate that the temperature remained between 50° and 60°C. When the addition had been completed, the heating and stirring were continued at 80°C./30 mm Hg for 5 hours to complete the formation of bis (2,3-dibromopropyl) chlorophosphate.

The bis(2,3-dibromopropyl) chlorophosphate was added over a period of 5 hours to a well agitated aqueous sodium phenate solution that had been cooled to 0°–10°C. The sodium phenate solution was prepared by adding 270 parts (2.2 moles) of phenol to a solution of 92 parts (2.3 moles) of sodium hydroxide in 1,300 parts of water. The bis(2,3-dibromopropyl) chlorophosphate was added at such a rate that the reaction temperature was maintained at 5°–10°C. When the addition had been completed, agitation was continued while the temperature was allowed to rise to 25°C. The organic layer was separated from the aqueous layer and then washed with five 400 part portions of water and dried at 80°–90°C./25 mm Hg. The product was stirred for fifteen minutes with filter-aid and then filtered. There was obtained 883 parts of phenyl bis(2,3-dibromopropyl) phosphate, which contained 5.16% P and 55.2% Br (calculated for $C_{12}H_{15}O_4Br_4P$, 5.40% and 55.7% Br) and which had an acid number of 0.12 and a refractive index ($n_d^{25}$) of 1.5673. The yield of phenyl bis(2,3-dibromopropyl) phosphate, based on $POCL_3$, was 77%.

EXAMPLE 2

To a mixture of 306.6 parts (2.0 moles) of phosphorus oxychloride and 0.5 part (0.0014 mole) of tetrabutyl titanate which had been heated with stirring to 80°C. was added 370.0 parts (4.0 moles) of epichlorohydrin over a period of about 3 hours at such a rate that the temperature remained between 80° and 85°C. When the addition had been completed, the heating and stirring were continued at 90°C./60 mm Hg until refluxing had ceased. This required 2 hours. The resulting bis(1,3-dichloropropyl) chlorophosphate was cooled to 25°C. and added over a period of 3 hours to a vigorously-agitated mixture of 207 parts (2.2 moles) of phenol, 84 parts (2.1 moles) of sodium hydroxide, 450 parts of benzene, and 100 parts of water. The reaction temperature was maintained at 5°–10°c. during the addition of the bis(1,3-dichloropropyl) chlorophosphate and then allowed to rise to 25°C. Ten parts of sodium carbonate was added to bring the pH of the aqueous phase to approximately 8. The organic phase was separated from the aqueous phase and then heated at 80 mm Hg to a maximum temperature of 50°C. to remove the solvent. The residue was washed at 25°–30°C. with three 300 part portions of water and dried at 100°C./25 mm Hg for 1 hour. It was stirred for 10 minutes with 4.5 parts of filter-aid and filtered at 50°C. There was obtained 681 parts of phenyl bis(1,3-dichloropropyl) phosphate, which contained 7.88% P and 31.8% CL (calculated for $C_{12}H_{15}O_4CL_4P$, 7.82% P and 35.8% CL). The yield of phenyl bis(1,3-dichloropropyl) phosphate, based on $POCL_3$, was 86%. The product had an acid number of 0.09 and a refractive index at 25°C. of 1.5215.

EXAMPLES 3–8

A series of phosphate esters was prepared by the procedures described in Examples 1 and 2. The compounds prepared and their properties are shown in Table I.

EXAMPLE 9

The following procedure was used to evaluate the products of Examples 1–8 as flame retardants for polyurethane resins:

The appropriate amount of a phosphate ester was mixed with 200 parts (0.200 equivalent OH) of a polyether that had a hydroxyl number of 56 (Polyol LG-56). The resulting mixture was blended with 2.5 parts of a silicone surfactant (DC 192), 0.60 part of triethylenediamine (Dabco 33-LV), and 7.4 parts of water. This mixture was homogenized for 4.5 minutes, 0.50 part of stannous octoate was added to it, and the homogenization was continued for 30 seconds. Then 96.4 parts (0.554 equivalent NCO) of tolylene diisocyanate (80% 2,4-isomer, 20% 2,6isomer) was added, and after homogenization for five seconds the mixture was poured into an 8 × 8 × 8 inch mold and allowed to rise. The resulting foams were cured in a circulating air oven at 150°C. for 5 minutes, cut into 6 × 2 × 0.5 inch specimens, and tested for flammability. The tests for flammability characteristics were conducted in accordance with "Method of Test for Flammability of Plasitc Foams and Sheeting", ASTM -1692-68T.

Table 1

| Ex. No. | Compound | Process Used | Yield % based on $POCl_3$ | Analysis (% calculated) P | Halogen | $n_D^{25}$ | Acid No. |
|---|---|---|---|---|---|---|---|
| 3 | Diphenyl (2,3-dibromo-propyl) phosphate | Ex. 1 | 64 | 6.28 (6.88) | 40.9 (40.0) | 1.5645 | 0.09 |
| 4 | Diphenyl (1,3-dichloro-propyl) phosphate | Ex. 2 | 76 | 8.70 (8.57) | 19.0 (19.6) | 1.5215 | 0.08 |

Table 1 — Continued

| Ex. No. | Compound | Process Used | Yield % based on POCl₃ | Analysis (% calculated) P | Analysis (% calculated) Halogen | $n_D^{25}$ | Acid No. |
| --- | --- | --- | --- | --- | --- | --- | --- |
| 5 | Phenoxyethyl bis(2,3-dibromopropyl) phosphate | Ex. 1 | 67 | 4.93 (5.01) | 49.8 (51.7) | 1.5615 | 0.11 |
| 6 | Bis(phenoxyethyl) (2,3-dibromopropyl) phosphate | Ex. 1 | 79 | 5.30 (5.75) | 30.3 (29.7) | 1.5516 | 0.08 |
| 7 | Phenoxyethyl bis(1,3-dichloropropyl) phosphate | Ex. 2 | 85 | 7.20 (7.04) | 30.6 (32.2) | 1.5214 | 0.04 |
| 8 | Bis(phenoxyethyl) (1,3-dichloropropyl) phosphate | Ex. 2 | 72 | 6.90 (6.90) | 15.9 (15.8) | 1.5346 | 0.07 |

The results obtained are summarized in Table II. For comparative purposes, foams that contained commerically-available flame-retardant materials were included in the tests.

Table II

| Phosphate Ester | Parts Phosphate Ester per 100 Parts Polyol | Burning Extent (cm.)* | Burn Rate (cm./min.) |
| --- | --- | --- | --- |
| Phenyl bis(2,3-dibromopropyl) phosphate | 10 | | 7.8 |
| | 25 | 4.6 | 7.9 |
| Diphenyl (2,3-dibromopropyl) phosphate | 10 | | 8.3 |
| | 25 | 4.6 | 6.6 |
| Phenyl bis(1,3-dichloropropyl) phosphate | 10 | | 9.4 |
| | 25 | 5.3 | 7.2 |
| Diphenyl (1,3-dichloropropyl) phosphate | 10 | | 9.7 |
| | 25 | 5.6 | 6.9 |
| Phenoxyethyl bis(2,3-dibromopropyl) phosphate | 10 | | 8.6 |
| | 25 | 4.3 | 9.6 |
| Bis(phenoxyethyl) (2,3-dibromopropyl) phosphate | 10 | | 11.6 |
| | 25 | 4.6 | 9.8 |
| Phenoxyethyl bis(1,3-dichloropropyl) phosphate | 10 | | 9.8 |
| | 25 | 6.9 | 7.7 |
| Bis(phenoxyethyl) (1,3-dichloropropyl) phosphate | 10 | | 9.6 |
| | 25 | 6.3 | 9.2 |
| Tris(2,3-dibromopropyl) phosphate (Firemaster T-2,3-P) | 10 | | 7.3 |
| | 25 | 4.2 | 6.3 |
| Tris(1,3-dichloropropyl) phosphate (Fyrol-2) | 10 | | 8.2 |
| | 25 | 4.7 | 8.3 |
| None | — | | 16.0 |

From the data in Table II, it will be seen that both the phenyl dihaloalkyl phosphates and the phenoxyethyl dihaloalkyl phosphates conferred significant flame-retardance to polyurethane resin foam even at the level of 10 parts per 100 parts polyol. At the level of 25 parts per 100 parts polyol, self-extinguishment resulted for all of the test compounds. In these tests it was found that sufficient flame-retardancy for commercial use was effected without appreciable sacrifice of desirable foam properties.

*An entry in this column indicates self-extinguishment at the level tested with the burn rate measured to the point of extinguishment. For free-burning samples, only the burn rate was recorded.

What is claimed is:

1. A flame-retardant polyurethane resin composition that comprises (a) the reaction product of an organic polyisocyanate and a polyol having a molecular weight of at least about 500 and (b) a flame-retarding amount of a phosphate ester that has the structural formula

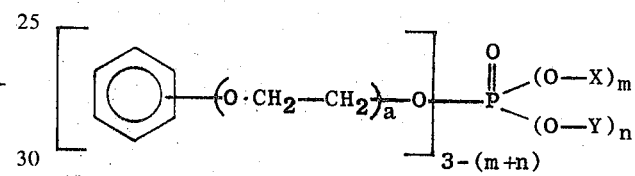

wherein X and Y each represents haloalkyl having 2 to 4 carbon atoms and at least 2 halogen atoms selected from the group consisting of chlorine, bromine, and mixtures thereof;

a represents a number in the range of 0 to 1; and m and n each represents a number in the range of 0 to 2, the sum of m and n being 1 to 2.

2. A flame-retardant polyurethane resin composition according to claim 1 wherein the phosphate ester is a phenyl dihalopropyl phosphate.

3. A flame-retardant polyurethane resin composition according to claim 2 wherein the phosphate ester is a phenyl (1,3-dichloropropyl) phosphate.

4. A flame-retardant polyurethane resin composition according to claim 2 wherein the phosphate ester is a phenyl (2,3-dibromopropyl) phosphate.

5. A flame-retardant polyurethane resin composition according to claim 1 wherein the phosphate ester is a phenoxyethyl dihalopropyl phosphate.

6. A flame-retardant polyurethane resin composition according to claim 5 wherein the phosphate ester is a phenoxyethyl (1,3-dichloropropyl) phosphate.

7. A flame-retardant polyurethane resin composition according to claim 5 wherein the phosphate ester is a phenoxyethyl (2,3-dibromopropyl) phosphate.

8. A flame-retardant polyurethane resin composition according to claim 1 that contains about 25 percent by weight of said phosphate ester, based on the weight of the polyol.

9. A flame-retardant polyurethane resin composition according to claim 1 wherein the phosphate ester is diphenyl (1,3-dichloropropyl) phosphate.

10. A flame-retardant polyurethane resin composition according to claim 1 that contains the amount of said phosphate ester that will provide at least 1 percent by weight of phosphorus when X and Y represent chloroalkyl or at least 0.5 percent by weight of phosphorus when X and Y represent bromoalkyl.

11. A process for the production of a flame-retardant polyurethane resin composition that comprises incorporating in a polyurethane resin that is the product of the reaction of an organic polyisocyanate with poyol having a molecular weight of at least 500 a flame-retarding amount of a phosphate ester that has the structural fomula

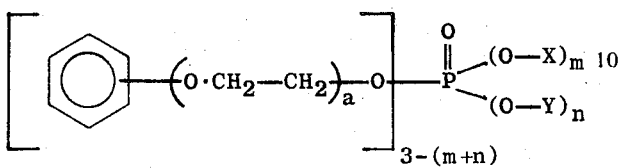

wherein X and Y each represents haloalkyl having 2 to 4 carbon atoms and at least 2 halogen atoms selected from the group consisting of chlorine, bromine, and mixtures thereof;

$a$ represents a number in the range of 0 to 1; and $m$ and $n$ each represents a number in the range of 0 to 2, the sum of $m$ and $n$ being 1 or 2.

12. The process of claim 11 wherein the phosphate ester is a phenyl dihalopropyl phosphate.

13. The process of claim 11 wherein the phosphate ester is a phenoxyethyl dihalopropyl phosphate.

14. The process of claim 11 wherein the phosphate ester is diphenyl (1,3-dichloropropyl) phosphate.

* * * * *

UNITED STATES PATENT OFFICE
CERTIFICATE OF CORRECTION

PATENT NO. : 3,872,053
DATED : March 18, 1975
INVENTOR(S) : Joseph Fath and Roy T. Gottesman It is certified that error appears in the above-identified patent and that said Letters Patent are hereby corrected as shown below:

Column 1, line 27, change "himidity" to -- humidity --.

Column 4, line 49, change "reacitve" to -- reactive --.

Column 4, line 56, change "pact flameretardance" to -- part flame retardance --.

Column 5, line 49, change "POCL$_3$" to -- POCl$_3$ --.

Column 6, line 23, change "CL" to -- Cl --.

line 23, change "C$_{12}$H$_{15}$O$_4$CL$_4$P" to -- C$_{12}$H$_{15}$O$_4$Cl$_4$P --.

line 24, change "CL" to -- Cl --.

line 25, change "POCL3" to --POCl$_3$ --.

Signed and sealed this 20th day of May 1975.

(SEAL)
Attest:

RUTH C. MASON
Attesting Officer

C. MARSHALL DANN
Commissioner of Patents
and Trademarks